United States Patent [19]

Nass et al.

[11] Patent Number: 5,750,193
[45] Date of Patent: May 12, 1998

[54] PROCESS FOR PRODUCING TIN SINTERED BODIES AND COATINGS

[75] Inventors: Rüdiger Nass, Riegelsberg; Mesut Aslan, Pirmasens; Sener Albayrak; Helmut Schmidt, both of Saarbrücken, all of Germany; Ertugrul Arpac, Antalya, Turkey

[73] Assignee: Institut Für Neue Materialien Gemeinnützige GmbH, Saarbrücken, Germany

[21] Appl. No.: 632,502

[22] PCT Filed: Oct. 10, 1994

[86] PCT No.: PCT/EP94/03335

§ 371 Date: May 6, 1996

§ 102(e) Date: May 6, 1996

[87] PCT Pub. No.: WO95/10491

PCT Pub. Date: Apr. 20, 1995

[30] Foreign Application Priority Data

Oct. 11, 1993 [DE] Germany .................... 43 34 639.1

[51] Int. Cl.$^6$ ........................................ B05D 7/00
[52] U.S. Cl. .................. 427/213.31; 427/215; 427/375; 427/384
[58] Field of Search ............... 427/213.31, 215, 427/375, 384; 501/96.1

[56] References Cited

U.S. PATENT DOCUMENTS

| 4,705,762 | 11/1987 | Ota et al. ..................... 501/96.1 |
| 4,948,762 | 8/1990 | Krumbe et al. ................. 501/92 |
| 5,030,597 | 7/1991 | Ogata et al. ................... 501/93 |
| 5,098,740 | 3/1992 | Tewari ......................... 427/215 |
| 5,284,616 | 2/1994 | Mattsson et al. ................ 419/44 |
| 5,420,083 | 5/1995 | Brandt ......................... 501/95 |
| 5,480,676 | 1/1996 | Sonuparlak ..................... 427/180 |
| 5,590,387 | 12/1996 | Schmidt et al. ................. 419/36 |
| 5,593,781 | 1/1997 | Nass et al. . |

FOREIGN PATENT DOCUMENTS 1111774  4/1989  Japan ..................... C04B 35/56

*Primary Examiner*—Benjamin Utech
*Attorney, Agent, or Firm*—Oblon, Spivak, McClelland, Maier & Neustadt, P.C.

[57] ABSTRACT

TiN sintered bodies and coatings are produced by dispersing nanocrystalline TiN powder in water and/or a polar organic solvent as dispersing agent in the presence of at least one low molecular organic compound having at least one functional group which can react or interact with groups on the surface of the powder particles, removing the dispersing agent and sintering the surface-modified TiN which has been processed into green bodies or coatings before or after the removal of the dispersing agent.

17 Claims, No Drawings

PROCESS FOR PRODUCING TiN SINTERED BODIES AND COATINGS

BACKGROUND OF THE INVENTION

1. Field of the Invention

The present invention relates to a process for producing sintered bodies or coatings of titanium nitride (TiN) using a suspension of surface-modified TiN particles in the nanoscale range.

2. Discussion of the Background

In the following "particles in the nanoscale range" are to denote particles whose average size is not higher than 100 nm, particularly not higher than 50 nm, and particularly preferred not higher than 30 nm.

In the processing of nanodisperse materials (particles, powders), there are essentially two problems, i.e.:

(a) control of particle agglomeration in the processing of said materials; and (b) production of processable ceramic compositions having a high solids content.

Regarding problem (a) it is to be noted that when going from ceramic powders in the sub-micron range to those in the nanoscale range, an increase in agglomeration is generally observed. This is due to the fact that with decreasing particle size, weak interactive forces such as van der Waals forces gain significant importance and dominate, respectively. Additionally, there are always functional groups, i.e., groups capable of undergoing condensation, on the particle surface. With conventional sub-micron powders, said forces are only of importance as far as they may be used as centers of interaction for necessary organic processing aids (dispersing aids, binders, etc.). Due to the high surface to volume ratio in nanodisperse materials, said surface groups are, however, also of great importance in another respect. On the one hand, they can also serve as reaction centers for organic processing aids. However, by condensation reactions between individual particles they can also result in the formation of hard agglomerates. Said particles are then connected to each other quasi by "sinter necks". Therefore, it is desirable to develop processes with which the agglomeration can be controlled such that agglomerated powders can be obtained in a controlled manner. Further, it would be favorable if by said process the reactive surface could be shielded outwardly, thus preventing a condensation between particles.

As regards the above problem (b) it may be noted that the production of ceramic compositions having high solids contents and processing properties adapted to a molding process causes severe difficulties. In order to avoid agglomerates which may result in serious defects both in the green and sintered bodies, the operation is usually carried out in suspension. For stabilizing the suspension, dispersion aids are added which dispersion aids have the function of preventing agglomeration and imparting the required processing properties to the suspension. In the stabilization of the suspension there are two different basic possibilities, i.e., electrostatic and steric stabilization.

The electrostatic stabilization is disadvantageous in that due to the high hydrodynamic radius of the suspended particles only low solids contents may be realized. In contrast thereto, the steric stabilization on principle offers the possibility of preparing suspensions of high solids contents from materials in the nanoscale range since in this case the hydrodynamic particle radius is much smaller.

The advantages of steric stabilization have already been demonstrated with nanodisperse $SiO_2$ as example. In this case, non-ionic organic polymers (e.g., polymethyl methacrylate) which become adsorbed onto the particle surface have generally been employed. The disadvantage of such a stabilization is that even therewith only solids contents of at the most about 20 to 30% by volume may be realized and that said stabilization can be applied to systems different from $SiO_2$ only with considerable restrictions. The reason therefor mainly is that the chemical properties relating to the surface (e.g., acidic/basic properties) specific for a particular material cannot be taken into account.

Thus, it is desirable to provide a process which makes it possible to modify the particle surface by corresponding chemical compounds so that an optimum degree of dispersion and high solids contents of the dispersion may be realized.

Titanium nitride (TiN) belongs to the group of metallic hard materials and has a cubic crystal structure. Due to its high proportion of covalent bonding, TiN has a high melting point, a high hardness as well as a high resistance to oxidation and corrosion. Said properties result in the application of TiN as layer material for protecting metals against wear, and as one of the components of multiple-phase ceramics such as $Al_2O_3$/TiN or $Si_3N_4$/TiN.

Currently, coatings of pure TiN and TiN coatings with added TiC, respectively are prepared via gas phase processes. Said processes include the CVD (chemical vapor deposition) and the PVD (physical vapor deposition) processes. Corresponding equipment is commercially available and is a part of industrial production processes. Said coatings are employed in the following fields:

protection of metals against wear in abrasive and tribological applications, on cutting, drilling and milling tools in order to increase the machining performance, as corrosion protection coatings in chemical reactors, as coatings of clock casings and jewelry.

One disadvantage of TiN coatings produced via CVD and PVD is the insufficient adhesion to the substrates so that said coatings frequently chip off and tools coated therewith become unserviceable prematurely. Employable substrates are metals having a high heat resistance, hard metals such as, e.g., WC/Co, or also ceramic indexable inserts.

A further application of TiN relates to the use in mixed ceramics such as, e.g., $Al_2O_3$/TiN or $Si_3N_4$/TiN. By adding TiN to said matrix materials the mechnical properties thereof, such as hardness, tenacity or compression strength, may be improved. The proportion of TiN in said composites may amount to up to 20% by volume. An application of TiN as bulk material is not currently known.

Due to its high covalent bonding character, pure TiN only has a very low sintering activity. Therefore, densification thereof usually requires the use of sintering additives. In the simplest case said sintering additive may be $TiO_2$ which is formed in air on the surface of TiN in the presence of water. Thus it has, for example, been reported that the pressureless sintering of TiN of medium grain size of 0.1 µm at temperatures of 1500° C. results in relative densities of up to 95%. Said sintering performance is attributed to the activation of the diffusion mechanisms via the dissolution of $TiO_2$ localized on the surfaces of the TiN particles, which mechanisms result in densification.

Various publications deal with the sintering of TiN under pressure and/or in the presence of sintering additives. Thus, the hot-pressing of TiN powders having a $d_{50}$ value of 1 µm at temperatures up to 2100° C. and a pressing pressure of 14

MPa leads to a density of only 93% of the theory; cf. M. Morijama et al., "Mechanical and Electrical Properties of Hot-pressed TiN-Ceramics without Additives", J. Jap. Ceram. Soc., 99 (1991). In M. Morijam et al., "The Mechanical Properties of Hot-pressed TiN-Ceramics with Various Additives", J. Jap. Ceram. Soc., 101 (1993), the sintering performance of TiN in the presence of sintering additives in a hot-pressing operation is described. After hot-pressing at 1950° C. and 14 MPa, samples containing a total of 10% by wt. of $Al_2O_3$, $Y_2O_3$ and $B_4C$ result in a density of around 97% of the theory. Furthermore, a 95% densification by hot-pressing at 1800° C. and 5.0 GPa has been reported.

SUMMARY OF THE INVENTION

The object of the present invention is to provide a process for producing TiN sintered bodies and coatings which makes it possible to control particle agglomeration and to obtain sufficiently high solids contents of the particle suspensions employed and which can be carried out at lower sintering temperatures.

According to the present invention said object is achieved by a process for producing TiN sintered bodies or coatings which is characterized in that nanocrystalline TiN powder is dispersed in water and/or a polar organic solvent as dispersion medium in the presence of at least one low molecular weight organic compound having at least one functional group capable of reacting and/or interacting with groups present on the surfaces of the powder particles, said dispersion medium is removed and said surface-modified TiN which prior to or after the removal of the dispersion medium has been processed into green bodies or coatings is sintered.

The process according to the present invention makes it possible to control the agglomeration of TiN powders in the nanoscale range, thus making it possible to produce dispersions of such particles at high solids contents in a satisfactory manner.

DESCRIPTION OF THE PREFERRED EMBODIMENTS

TiN powder having a primary particle size of preferably below 100 nm is particularly suitable as starting material for the process according to the present invention. Said powder in the as-supplied-form is strongly agglomerated and has agglomerates of a size of several 10 μm. Further, said powder is known to be present in the crystalline form of osbornite and to have a thin layer of $TiO_2$ on the particle surface.

In order to deagglomerate the agglomerates of the TiN starting material in the dispersion medium into their primary particles and to prepare a stable nanodisperse suspension, according to the present invention surface-modifying agents, i.e., surface-modifying low molecular weight organic (=carbon containing) compounds having at least (and preferably) one functional group capable of reacting and/or (at least) interacting with groups present on the surfaces of the TiN particles are employed. Particularly, compounds having a molecular weight not higher than 1000, preferably not higher than 500, and particularly not higher than 350 are suitable for said purpose. Preferably, such compounds are liquid under normal conditions and soluble or at least emulsifyable in the dispersion medium.

Such compounds preferably have not more than a total of 30, particularly not more than a total of 20, and particularly preferred not more than 15 carbon atoms. The functional groups which said compounds are required to have are in the first place determined by the surface groups of the respective TiN starting material employed and, additionally, by the desired interaction. It is particularly preferred if an acid/base-reaction according to Bronsted or Lewis (including complex formation and adduct formation) can take place between the functional groups of the surface-modifying compound and the surface groups of the TiN particles. An example of a further suitable interaction is the dipole-dipole-interaction. Examples of preferred functional groups thus are carboxylic acid groups, (primary, secondary and tertiary) amino groups and C-H-acidic groups. Also, several of said groups may be present simultaneously in a molecule (betaines, amino acids, EDTA, etc.).

Accordingly, examples of particularly preferred surface-modifying agents are saturated or unsaturated mono- and polycarboxylic acids (preferably monocarboxylic acids) having 1 to 12 carbon atoms (e.g., formic acid, acetic acid, propionic acid, butanoic acid, pentanoic acid, hexanoic acid, acrylic acid, methacrylic acid, crotonic acid, citric acid, adipic acid, succinic acid, glutaric acid, oxalic acid, maleic acid and fumaric acid). If unsaturated carboxylic acids are employed there is the additional possibility of carrying out a crosslinking reaction by means of the ethylenically unsaturated double bond.

Examples of further suitable surface-modifying agents are mono- and polyamines, particularly those of the general formula $R_{3-n}NH_n$, wherein n=0, 1 or 2, and the radicals R independently are alkyl groups having from 1 to 12, particularly from 1 to 6, and particularly preferred from 1 to 4 carbon atoms (e.g., methyl, ethyl, n- and i-propyl and butyl) and ethylene polyamines (e.g., ethylene diamine, diethylene triamine, etc.); β-dicarbonyl compounds having from 4 to 12, particularly from 5 to 8 carbon atoms, such as, e.g., acetylacetone, 2,4-hexanedione, 3,5-heptanedione, acetoacetic acid, and acetoacetic acid $C_1-C_4$ alkyl esters; organoalkoxy silanes, such as those employed for the surface-modification of colloidal silica (e.g., those of the general formula $R_{4-m}Si(OR')_m$, wherein the groups R and R' independently represent $C_1-C_4$ alkyl and m is 1, 2, 3 or 4); and modified alcoholates, wherein the OR groups (R as defined above) are partially substituted by inert organic groups, and bonding (condensation) onto the particle surface takes place through the still present OR groups and said organic groups take care of the shielding. Examples thereof are zirconium and titanium alcoholates $M(OR)_4$ (M=Ti, Zr), wherein the groups OR are partially replaced by complex forming agents such as a β-dicarbonyl compound or a (mono)carboxylic acid. If an ethylenically unsaturated compound (such as, e.g., methacrylic acid) is used as complex forming agent, additionally also a crosslinking reaction can take place (see above).

Particularly preferred surface-modifying agents are guanidine carbonate and guanidinopropionic acid.

As dispersion medium, water and/or polar organic solvents are employed. As polar organic solvents, preferably those which are miscible with water are suitable. Specific examples of employable polar organic solvents are alcohols such as, e.g., aliphatic alcohols having 1 to 6 carbon atoms (particularly methanol, ethanol, n- and i-propanol and butanol); ketones such as, e.g., acetone and butanone; esters such as, e.g., ethylacetate; ethers such as, e.g., diethylether, tetrahydrofuran and tetrahydropyran; amides such as, e.g., dimethylacetamide and dimethylformamide; sulfoxides and sulfones such as, e.g., sulfolane and dimethylsulfoxide; and halogenated aliphatic hydrocarbons. Mixtures of said solvents may, of course, also be employed.

The dispersion medium employed preferably has a boiling point which makes it possible to remove said dispersion medium by distillation (optionally under reduced pressure) without any problems. Solvents having a boiling point below 200° C., particularly below 150° C., are preferred.

In practicing the process according to the present invention, the concentration of dispersion medium generally is 20 to 90% by wt., preferably 30 to 80% by wt., and particularly 35 to 75% by wt. The balance of the dispersion is constituted of TiN starting powder and low molecular weight organic compound (surface-modifying agent). In this case the weight ratio TiN powder/surface-modifying agent generally ranges from 1000:1 to 4:1, particularly from 500:1 to 8:1, and particularly preferred from 250:1 to 10:1.

The process according to the present invention is preferably carried out at a temperature of from room temperature (about 20° C.) to the boiling temperature of the dispersion medium. Dispersing temperatures ranging from 50° to 100° C. are preferred. In a particularly preferred embodiment the operation takes place under reflux of the dispersion medium.

The dispersion time depends on the type of the materials employed but generally ranges from several minutes to several hours, e.g., 1 to 24 hours.

In order to enhance the deagglomeration, the dispersion (suspension) may optionally be treated with ultrasonic waves, intensive mixers or grinding processes conventional in the field of ceramic materials, e.g., agitator-ball mills.

Following the completion of the surface-modification, the dispersion (suspension) obtained may either be further processed as such (i.e., for the production of green bodies or for the coating of substrates) or prior to said further processing the dispersion medium is completely or partially removed (e.g., up to a desired solids concentration). A particularly preferred process for the removal of the dispersion medium is freeze-drying or freeze-spraydrying.

Following the drying operation, the surface-modified TiN powder may optionally be dispersed in a different dispersion medium comprising water and/or an organic solvent. For a complete redispersion it has proved efficient to first modify the TiN with guanidinopropionic acid and to then redisperse it in alcohol or also pure water.

The TiN suspensions obtained according to the process of the present invention and the dry surface-modified nanocrystalline TiN powder, respectively have a particle size distribution below 100 nm. They may be further processed in various ways for the preparation of green bodies and sintered bodies or coatings, respectively. Extrusion compositions which after the extrusion may be sintered to finished molded bodies may, for example, be prepared. For said purpose, there are usually employed from 20 to 80, particularly from 30 to 70, and particularly preferred from 40 to 60 parts by wt. of surface-modified TiN powder (either as such or in the form of a dispersion, e.g., as prepared above), from 10 to 70, particularly from 20 to 60, and particularly preferred from 30 to 50 parts by wt. of dispersion medium, and from 0.5 to 20, particularly from 2 to 15, particularly preferred from 5 to 10 parts by wt. of additives selected from binders, plastifiers and mixtures thereof, per 100 parts by wt. of extrusion composition.

The mentioned binders and plastifiers are preferably selected from modified celluloses (e.g., methyl cellulose, ethyl cellulose, propyl cellulose, and carboxy-modified cellulose), polyalkylene glycols (particularly polyethylene glycol and polypropylene glycol, preferably having an average molecular of 400 to 50000), dialkylphthalates (e.g., dimethylphthalate, diethylphthalate, dipropylphthalate, and dibutylphthalate), and mixtures of said substances. Other binders and plastifiers such as, e.g., polyvinyl alcohol, etc., may, of course, also be employed.

The above binders and plastifiers are required in order to ensure the formation of an extrudable composition and a sufficient dimensional stability after the molding operation.

After the thorough mixing of the above components (e.g., in a conventional mixer), a part of the dispersion medium may be removed again (preferably under reduced pressure) until the extrusion composition has the desired solids content. Preferred solids contents of the extrusion composition are at least 30%, and particularly at least 40% by volume.

Other preferred molding processes are electrophoresis, slip casting, slip casting under pressure, and filter pressing as well as combinations of electrophoresis and slip casting, slip casting under pressure or filter pressing; further injection molding, fiber spinning, gel casting, and centrifugation. Compact molded bodies having high green densities are obtained in said molding processes. It is also possible to use the suspensions for coating purposes. Suitable coating processes are dip coating, spin coating, doctor blade coating, brushing, and electrophoresis. Suitable substrates are, e.g., metals, ceramic materials, hard metals, glass, and cermets.

The green bodies and coatings, respectively produced may then be dried and subjected to a sintering treatment. Surprisingly it has been found that the desired densification takes place already at relatively low temperatures. Furthermore, surprisingly no sintering additives are required. The sintering temperature is usually in the range of from 900° to 1500° C., preferably from 1100° to 1300° C. This is significantly lower than according to the prior art, where temperatures up to 2000° C., sintering additives and possibly also pressure are usually required.

The TiN sintered bodies and coatings, respectively are characterized by a nanoscale structure having grain sizes below 100 nm, a density >95% of the theory and a hardness of $HV_{0.5}$ >18 GPa.

The TiN produced according to the present invention may, e.g., be employed as

Ceramic bulk material, e.g., for grinding powders.

Coating material for metals, ceramics and glass for decoration purposes, wear protection, tribological applications, corrosion protection, particularly as coating on cutting tools and grinding agents and grinding powders, respectively.

Component in ceramics/ceramic composites. As matrix phase, $Al_2O_3$, TiC, SiC and $Si_3N_4$ may, for example, be envisaged.

Component of nanocomposites.

Sintering aids for coarser TiN and other ceramic materials.

Metal/ceramics composites of the hard material type.

Cermets.

Microporous layers for filtration purposes, e.g., micro-ultra-nano-filtration and reverse osmosis.

The following examples are to further illustrate the present invention without, however, being a limitation thereof.

EXAMPLE 1

Surface-Modification of TiN in the Nanoscale Range

In 200 ml of a water/ethanol mixture (volume ratio 1:1), 1 g of guanidinopropionic acid is dissolved. Under continuous stirring, 10 g of TiN powder are added to said solution. Subsequently, the mixture is heated under reflux at 100° C. for 5 hr. After the reaction time has lapsed the suspension is separated and the filter residue is washed with ethanol. The moist powder obtained is dried at 70° C. for 8 hr.

EXAMPLE 2

Redispersion and Formation of a Slurry of the TiN Powder

The surface-modified TiN powder of Example 1 (60 g) is added to 100 ml of water under continuous stirring and intermediate ultrasonic treatment, maintaining the pH of the suspension at a value of about 9 by adding tetrabutyl ammonium hydroxide. This results in a stable slurry having a solids content of 37.5% by wt. The particle size ranges from 20 to 50 nm.

EXAMPLE 3

The process of Example 2 is repeated with the exception of using methanol as redispersion medium instead of water.

EXAMPLE 4

The process of Example 2 is repeated with the exception of using ethanol as redispersion medium instead of water.

EXAMPLE 5

Preparation of Green Body from the TiN Slurry (Slip Casting)

The 37.5% by wt. TiN slurry of Example 2 (50 ml) is poured into a round PMMA mold (diameter: 40 mm, height: 50 mm, pore size 1 µm). After a holding time of 6 hr a green body having the following dimensions is formed: diameter 40 mm, height 3 mm, green density 40–50% of the theory.

EXAMPLE 6

A green body is produced according to Example 5 with the exception that additionally pressure (e.g., 5 bar) is applied in order to reduce the casting time.

EXAMPLE 7

Sintering of the Green Body

Green bodies produced according to Example 5 are dried under controlled humidity and temperature in a climatic cabinet. Following the drying operation, said bodies are sintered in an argon atmosphere at temperatures between 1100° and 1300° C. The heating rate is 3 K/min up to T=600° C., 20 K/min between 600° C. and the isothermic holding temperature. By this sintering treatment the samples reach relative densities above 95% of the theory and have average grain sizes above 100 nm.

EXAMPLE 8

Coating of $Al_2O_3$ Substrates

Following the process of Example 1, a 20% by wt. aqueous suspension of surface-modified TiN powder is prepared. A dense-sintered $Al_2O_3$ plate is coated by dipping it into the suspension. The coated plate is dried and sintered at 1300° C. in an argon atmosphere. Thereby a compact TiN overcoat layer having a thickness of about 5 µm is obtained.

What is claimed is:

1. A process for producing TiN sintered bodies or coatings, comprising the steps of:
    adding TiN powder comprising agglomerated nanocrystalline TiN particles to a dispersion medium in the presence of at least one organic surface-modifying agent;
    deagglomerating said powder by allowing said organic surface-modifying agent to react or interact with a surface of said nanocrystalline TiN particles, thereby forming a nanodisperse suspension of surface-modified nanocrystalline TiN particles;
    processing said surface-modified nanocrystalline TiN particles into a green body or coating; and
    sintering said green body or coating;
    wherein said dispersion medium is removed.

2. Process according to claim 1, wherein said green body or coating is sintered at a temperature of up to 1300° C.

3. Process according to claim 1, wherein said organic surface-modifying agent has a molecular weight of not more than 1000.

4. Process according to claim 1, wherein said organic surface-modifying agent is selected from the group consisting of aliphatic, saturated or unsaturated $C_1$–$C_{12}$ monocarboxylic acids, polycarboxylic acids, amines of the formula $R_{3-n}NH_n$, wherein n=0, 1 or 2 and the radicals R independently represent $C_1$–$C_{12}$ alkyl groups, $C_4$–$C_{12}$ β-dicarbonyl compounds, organotitanates, organozirconates, modified alcoholates, and organoalkoxysilanes.

5. The process according to claim 4, wherein said radicals R independently are $C_1$–$C_6$ alkyl groups.

6. The process according to claim 4, wherein said β-dicarbonyl compounds are $C_5$–$C_8$ β-dicarbonyl compounds.

7. Process according to claim 1, wherein said dispersion medium comprises a medium selected from the group consisting of water, a polar organic solvent, and a mixture of water and a polar organic solvent.

8. Process according to claim 1, wherein said dispersion medium is present in an amount from 20 to 90% by wt. based on the total weight of said dispersion medium, said TiN powder and said organic surface-modifying agent.

9. The process according to claim 8, wherein said dispersion medium is present in an amount of 30 to 80% by weight, based on the total weight of said dispersion medium, said TiN powder, and said organic surface-modifying agent.

10. Process according to claim 1, wherein the weight ratio of said TiN powder to said organic surface-modifying agent ranges from 1000:1 to 4:1.

11. The process according to claim 10, wherein said weight ratio ranges from 500:1 to 8:1.

12. Process according to claim 1, wherein said deagglomerating step is carried out at a temperature of from 20° C. to the boiling temperature of said dispersion medium.

13. The process according to claim 12, wherein said deagglomerating step is carried out under reflux of said dispersion medium.

14. Process according to claim 1, wherein said dispersion medium is removed by freeze-drying.

15. Process according to claim 1, wherein after said dispersion medium is removed, said surface-modified nanocrystalline TiN particles are redispersed in a second dispersion medium having a composition that is the same as or different from the first said dispersion medium.

16. The process according to claim 1, wherein said organic surface-modifying agent is guanidine carbonate or guanidinopropionic acid.

17. The process according to claim 1, wherein during said allowing step wherein said organic surface-modifying agent reacts or interacts with a surface of said nanocrystalline TiN particles, the reaction or interaction is selected from the group consisting of a Bronsted or Lewis acid/base reaction, a Bronsted or Lewis complex formation, a Bronsted or Lewis adduct formation, a dipole-dipole interaction, a condensation reaction, and a mixture thereof.

* * * * *